United States Patent [19]

Kletecka

[11] Patent Number: 5,049,600
[45] Date of Patent: Sep. 17, 1991

[54] MULTI-COMPONENT STABILIZER SYSTEM FOR POLYOLEFINS PIGMENTED WITH PHTHALOCYANINE PIGMENTS

[75] Inventor: George Kletecka, Fairview Park, Ohio

[73] Assignee: The BF Goodrich Company, Akron, Ohio

[21] Appl. No.: 468,520

[22] Filed: Jan. 23, 1990

[51] Int. Cl.$^5$ .................... C08K 5/3492; C08K 5/3495
[52] U.S. Cl. ........................................ 524/88; 524/100; 524/125
[58] Field of Search ............................ 524/88, 100, 125

[56] References Cited

U.S. PATENT DOCUMENTS

| | | | |
|---|---|---|---|
| 3,901,848 | 8/1975 | Dibattista et al. | 524/125 |
| 4,480,092 | 10/1984 | Lai et al. | 544/113 |
| 4,753,979 | 6/1988 | Conetta et al. | 524/102 |
| 4,816,507 | 8/1989 | Contatore et al. | 524/100 |

OTHER PUBLICATIONS

Klemchuk, "Influence of Pigments on Light Stability of Polymers", Polymer Photochemistry, 3, (1983), 1–27.

*Primary Examiner*—Kriellion S. Morgan
*Attorney, Agent, or Firm*—Alfred D. Lobo

[57] ABSTRACT

Excellent color stabilization as well as fiber integrity is obtained in bright sunlight and at relatively high temperature, in polyolefin (PO) articles pigmented with phthalocyanine pigments, by combining the pigment with two 'large molecule' primary stabilizers, the first a hindered amine light stabilizer (HALS) and the second a metal-organic phosphonate. The first contains at least one triazine ring, and each substitutable position on each triazine ring is substituted with an oxo-piperazinyl group; the second is a 2.1 complex of an alkylated phenol phosphonate with a Group VIII or Group IIA metal, e.g. a metal bis[O-alky(3,5-di-t-butyl-4-hytdroxybenzyl)] phosphonate ("35-DHBP"). Stabilization of the PO's color is obtained for as long as the PO articles themselves are stabilized by the combination of primary stabilizers. With the combination, phthalocyanine pigmented articles are not only thermooxidatively and light-stabilized, but there is exceptionally low color fade. Because fibers are extruded twice for better distribution of pigment, a small amount, no more than 0.1 phr of a secondary melt-stabilizer, may be used. Blue- and green-pigmented PO articles in particular, so stabilized, exhibit less than a ±2 change in color (color fading) due to degradation of the pigment, over exposure resulting in absorption of 1240 Kjoules. Such exposure, deemed equivalent to exposure to sunlight for about 2 years in Florida at a 45° South exposure, of PP fibers pigmented with the combination of primary stabilizers suffer essentially no loss of color due to degradation of the pigmented polymer.

30 Claims, 1 Drawing Sheet

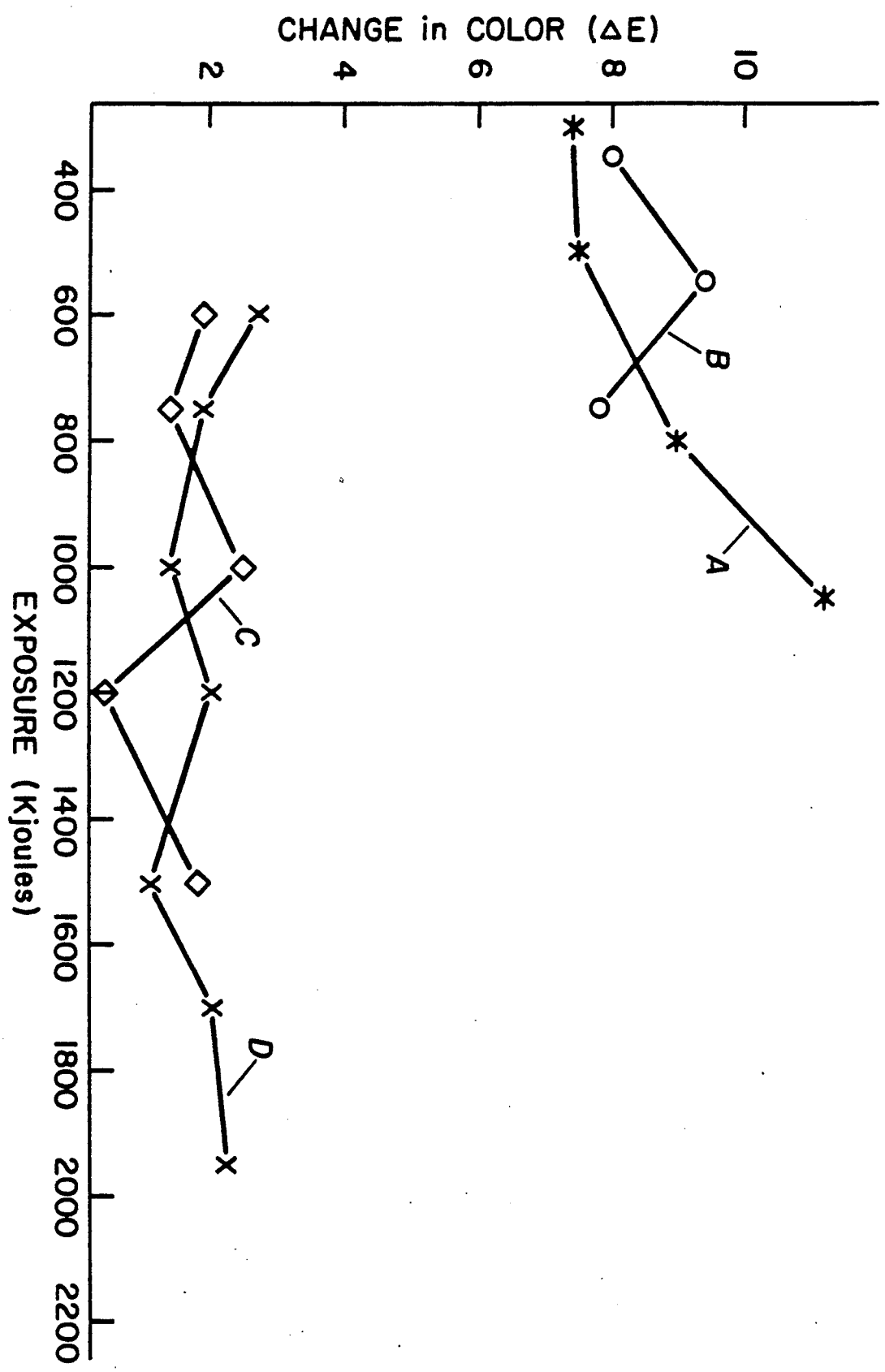

MULTI-COMPONENT STABILIZER SYSTEM FOR POLYOLEFINS PIGMENTED WITH PHTHALOCYANINE PIGMENTS

BACKGROUND OF THE INVENTION

Stabilizers for synthetic resinous materials are routinely stated to be useful in conjunction with phenolic antioxidants, pigments, colorants or dyes, secondary stabilizers which may be hindered amines, metal deactivators, etc. yet fail to recognize the problems of making such combinations. For example, phenolic antioxidants have a high proclivity to turn yellow; the same pigment functions unpredictably in different substrates; some pigments are prodegradants in polyolefins but not in polyacetals; and hindered amine light stabilizers are generally unable to stabilize color due to a pigment over the life of a polyolefin exposed to bright sunshine.

The continued improvement in stability provided by improved hindered amine light stabilizers allow a wide variety of pigmented thermoformed shaped articles including molded articles, fibers and sheets of stabilized polyolefins, and other normally solid predominantly ethylene-and propylene-containing copolymers (together referred to hereafter as "PO" for brevity) to have a useful life longer than the period over which the original color survives. Nevertheless the consumption of such articles has grown apace. Among the most popular are phthalocyanine-pigmented articles having a well-known proclivity to change color long before they lose their integrity. This is particularly unfortunate because phthalocyanine pigments in polyethylene (PE) and polypropylene (PP) are ideal pigments in most other respects. Retention of blue or green color, and other shades derived from phthalocyanine pigments in articles exposed to sunlight over their useful life, is of great practical value in automotive fabrics, molded PO household goods, and clothing made from woven or non-woven fabrics of the pigmented PO fibers or sheet. To combat the problem of color fading, a better solution is constantly being sought to decelerate color loss which is at least as important as stabilization of the mass of the PO.

This invention particularly relates to the stabilization of shaped articles of PO, specifically of PE and PP articles colored with phthalocyanine pigments which provide colors across the entire visible spectrum; more particularly, it relates to those pigments which provide either a blue or a green color, and various shades thereof.

It is known that several stabilizers, particularly hindered amine stabilizers ("HALS"), by themselves, provide excellent stabilization of PO to heat, light and ultraviolet radiation; and, some hindered phenol stabilizers are antioxidants which provide both excellent thermal oxidative stabilization, and light stabilization of PO, but such stabilization does not extend to that of color in phthalocyanine-pigmented PO. For example, the combination of a hindered piperidyl compound such as commercially available Chimassorb 944 has been combined with a benzoate type stabilizer such as 3,5-disubstituted-4-hydroxybenzoate, and a phosphite such as bis-di-t-butyl-pentaerythritol phosphite commercially available as Ultranox (see Japanese publication JP-230401 (1987) to Sumitomo Chem Ind KK). But there is no indication that such a combination might have been notably effective to stabilize any pigment or dye.

In like vein, U.S. Pat. No. 4,753,979 to Conetta et al disclose that a single polysubstituted piperazinone moiety (PSP) connected to alkyl, alkenyl, aralkyl, hydroxyalkyl, alkanoyloxyalkyl, alkenoyloxyalkyl and bezoyloxyalkyl; or two PSPs connected by an alkylene bridge, may be combined with a host of other stabilizers, including numerous 3,5-di-t-butyl-4-hydroxybenzylphosphonates. But metal complexes of the phosphonates appear either to have been overlooked, or deemed unlikely to be of any significant benefit. Of course, it would not have been possible to foresee that connecting at least three or two PSPs to one, or two triazine rings, respectively, in the same molecule, might provide a unique benefit relative to limiting the loss of color due to phthalocyanine pigments in PO to ±2 units.

More recently, U.S. Pat. No. 4,816,507 to Cantatore et al discloses that certain polyalkyleneamines with pendant polysubstituted piperidyl groups having a methylated N atom are effective light stabilizers in combination with all nickel compounds including nickel salts of 4-hydroxy3,5-di-tert-butylbenzylphosphonic acid monoalkyl esters (3,5-DHBP), all fillers and reinforcing agents, and all other additives, including pigments. But there is no indication what effect such all-inclusive combinations might have on the color stability of pigments of any kind.

Of specific interest is that numerous pigments for PO, by themselves, provide a significant level of stabilization to PO, but there are many which have no noticeable effect on stability, and still others which accelerate degradation, that is, are prodegradants. To date, the only reliable method of determining to which group a pigment belongs, is by actually testing it in a particular substrate of interest. It is known, for example, a pigment which is a stabilizer in PP may be a prodegradant in a polyacetal.

Phthalocyanine pigments are known to have good color stability. They also provide some measure of light stabilization by virtue of their ability to block the path of radiation, thus shielding phthalocyanine-pigmented polymer. Such small measure of light stabilization is observed in PP at about 0.4 phr. However, in combination with a stabilizing amount of a known HALS primary stabilizer, stabilization provided by 0.4 phr of a phthalocyanine pigment is not substantial. But increasing the concentration of pigment above about 1 phr may produce "bronzing". "Bronzing" is basically a surface effect which is evident to the naked eye when the surface of the pigmented article is viewed from different angles. Excessive migration of the pigment to the surface results in an apparent metallic sheen or glaze. Since the phthalocyanine pigment is used only for tinctorial purposes in PO, the concentration of pigment is limited to a level insufficient to cause bronzing, usually about 1 phr.

Phthalocyanine pigments have a generally flat tetra benzo tetra azo porphin structure. The pigments are usually made by the reaction of a phthalic acid derivative at a temperature of about 190° C. with a source of nitrogen such as urea and a metal or metal salt. Molybdates, vanadates, and certain compounds of titanium have been found to be useful catalysts for this condensation reaction. Phthalocyanine pigments available as commercial products are (a) Blue 15, Blue 16 and Blue 29, with shades of blue available, for example, as Blue 15:1 through Blue 15:6; and (b) Green 7, Green 36-3Y, Green 36-6Y.

Commercially available PO articles, and fibers in particular, have successfully been stabilized against ultraviolet (UV) light degradation and have good resilience and heat stability with a wide spectrum of HALS. But such stabilized PO articles have poor dyeability because PO is essentially unreactive with most dyes. This poor dyeability of PO dictates that the PO articles be pigmented for long-term stability of PO if it is to be colored with many popular colors. With particular respect to PP articles pigmented with blue, green and shades thereof, which pigmented articles are in high demand, the pigments most often used are Blue 15 and Green 7 respectively. The problem is that the use of such pigments in combination with known stabilizers, both hastens the degradation of the PO articles when exposed to sunlight, and accelerates the fading of their color over time. When combined, stabilizers and phthalocyanine pigment, are subjected to a two-pronged attack on the longevity of phthalocyanine-pigmented articles in normal use, thus vitiating their marketability Fabrics made from phthalocyanine-pigmented PO, and especially PP fibers, are highly popular in automobiles, boats, outdoor clothing, and other such uses where the fibers degrade at such an unacceptably high rate upon exposure to sunlight, that they are soon transformed into nonuniformly colored articles sporting a wide spectrum of unwanted shades of blue, green, pink and orange. The obvious way to cope with this color degradation problem is to use far more pigment than is required to provide the desired color, with the expectation that, upon suffering the expected color degradation, the coloration of the remaining non-degraded pigment will maintain acceptable, if not the original, color. Except that 'loading up' the HALS-stabilized PO article with excess phthalocyanine pigment to maintain tinctorial strength, simply accelerates degradation of the PO fibers because the pigment has a high proclivity towards reaction with commonly used HALS, and other additives such as antioxidants and antiozonants, used to provide melt-stability to the PO.

Typically, several additives are combined in PO before it is melt-extruded into fiber, each additive specifically designed to provide a different zone of stabilization, the main zones being (a) melt extrusion stability, (b) long term thermal oxidative stability during conditions expected to be encountered during use, (c) UV light stability in bright, direct sunlight, and by no means of least importance, (d) stable tinctorial strength to maintain the desired color. Combining several additives known to be effective for each specific purpose, in PO articles generally, and fibers in particular, is likely not to produce the desired results because of objectionable side effects due to interaction between the additives.

For example, thiodipropionate compounds such as dilauryl (DLTDP) and distearyl (DSTDP) help control meltstability despite an odor problem, and certain phosphites control melt flow while depressing the tendency of PO fibers to 'yellow' because the fibers usually contain a hindered phenol antioxidant. The hindered phenol antioxidant increases long term stability but accelerates yellowing. It is known that a hindered phenol antioxidant and a thiodipropionate are most effective when used together in PO. Certain HALS provide not only excellent UV stability but also such good long term thermal stability that the PO articles will outlast some of the pigments used to color the articles, but when combined, the interaction of stabilizers and pigment is unpredictable. Therefore various combinations of stabilizers have been used, the HALS being combined with hindered phenol antioxidants, phosphites and thiodipropionate, until by extensive trial and error a suitable combination is found.

Pigments are selected with an eye to their effect on the processing of the PO articles, the stability requirements of the end product, the pigment's interaction with the other additives to be used, the color requirements, and the cost of producing the pigmented PO articles. The intense thrust towards using inexpensive PO sheet, fibers and assorted molded articles in the automobile industry where the colors blue and green are in high demand decreed that, despite their high cost, phthalocyanine pigments be used, because of their intense tinctorial strength and color stability; and, that phthalocyanine pigments be combined with a compatible UV stabilizer. It was found that the most damaging factor in the stability of phthalocyanine-pigmented PO fibers was their interaction with the hindered amine UV stabilizers used.

The commercial use of pigments in PO articles, particularly fibers, requires that the color stability of the PO fiber be such that it equals the useful life of a fabric or other article produced from the PO, when the article is exposed to heat and light. Because the stabilizers used generally affect color, though they are not regarded as colorants, and pigments may affect thermal and UV light stability even if they are not known to have such activity, one cannot estimate what the net effect of the interactions might be. (see "Influence of Pigments on the Light Stability of Polymers: A Critical Review" by Peter P Klemchuk, *Polymer Photochemistry* 3 pg 1–27, 1983).

We continued our tests with numerous combinations of stabilizers in Blue 15-pigmented fibers, screening the samples to determine whether an unacceptable level of color loss was obtained before the fibers disintegrated. We measured the degree of degradation of the pigmented fibers both by visual observation, and by "scratch testing" (described herebelow) the surfaces of exposed fibers.

Fiber degradation is a phenomenon which is easily visible to the naked eye upon inspection of a degrading pigmented yarn exposed either in a Weather-O-Meter in presence of moisture, or, to bright sun (tests are conducted in the Florida sun) under ambient conditions of humidity. Unstabilized Blue 15-pigmented PP fibers exposed to the Florida sun show no fading because the pigmented fibers degrade far more rapidly than the pigment, which results in continual sloughing off of layers of fiber exposing bright undegraded pigment. Degradation of stabilized PP fibers is characterized (i) by a fuzzy, peach-skin-like appearance of the surface of the fabric (made with the pigmented fibers), and (ii) the problem of fading color.

Of particular interest is the peculiar UV-stabilization effect of an oxo-piperazinyl triazine stabilizer ("PIP-T" for brevity) in which all substitutable positions on each triazine ring are polysubstituted piperazin-2-ones. Such PIP-T HALS are disclosed in U.S. Pat. No. 4,480,092 to John T. Lai et al, for their UV-light stabilization in PP, and, because of the presence of the polysubstituted piperazinone (PSP) group in large PIP-T molecules, were routinely tested in PP plaques for such stabilization-effectiveness as each PIP-T might have. The majority of PO now pigmented with phthalocyanine pigments is now used in PO fibers. Because of the known generally higher sensitivity of pigmented fibers to degradation, compared to plaques, most testing for stabilization was done with fibers. It was during such testing that the remarkable effectiveness of a combination of two known primary stabilizers with phthalocyanine-pigmented PO fibers was noted.

By a "primary" stabilizer we refer to one which provides either long term thermal oxidative stability during conditions expected to be encountered during use, or, UV light stability in bright, direct sunlight. Melt extrusion stability to stabilize the PO during processing is typically provided by secondary stabilizers. Though the present invention does not require the use of any secondary stabilizer, in those instances, for example in fiberspinning, where the melt is extruded at about 270° C. (for PP fibers) more than once to obtain better pigment distribution, the PO may contain a small amount, less than 0.1 phr of a melt (or "process") stabilizer.

As one would expect, some pigments enhance heat and light stability of PO articles stabilized with a particular antioxidant and hindered amine stabilizer. Other pigments have the opposite effect with the same combination. Until tested, one cannot predict with reasonable certainty, what the effect will be. For example, with a nickel-containing stabilizer, Red 101 (iron oxide) is a prodegradant. With the more effective hindered amine stabilizers, both Yellow 93 and Red 144 are prodegradants. The effect of these pigments in stabilized PO articles could not have been predicted by their behavior in unstabilized pigmented fibers, or by their behavior with a different stabilizer. With a nickel-containing stabilizer, Blue 16 is a stabilizer (not a prodegradant), but Blue 16 is a prodegradant with Tinuvin 770 in the GM Weather-O-Meter test (details of which are provided herebelow). Yellow 93, a stabilizer when no other stabilizer is present, is neutral with nickel stabilization but is a prodegradant with Tinuvin 770 (see "Stabilization of Polypropylene Fibers" by Marvin Wishman of Phillips Fibers Corporation in a paper presented at the 1985 International Conference on "Advances in Stabilization and Controlled Degradation of Polymers" in Lucerne, Switzerland). Specifically with respect to blue PP fibers, the problem was to find a combination of stabilizers which circumvented the proclivity of Blue 16 to degrade the PP fibers when the pigment is combined with a conventional AO and UV- light stabilizer. Because Blue 16 was a prodegradant it seemed desirable to use only as much of it as would provide the desired tinctorial effect for the required period of time, namely the useful life of the stabilized PP fiber.

The effect of a large number of pigments on the stability of PP fibers stabilized with Tinuvin 770 has been reported by Steinlin and Saar (see "Influence of Pigments on the Degradation of Polypropylene Fibers on Exposure to Light and Weather", paper presented at the 19th International Manmade Fiber Conference, Sept. 1980 in Austria).

In the same vein, like other workers before us, we tested a large number of combinations of primary stabilizers with Blue 15, and tested them mainly in PP. We opted to use large stabilizer molecules, comparable in size to the size of phthalocyanine, and confirmed that Chimassorb 944 in combination with Blue 15, stabilizes PP fiber but does not stabilize the blue color. Chimassorb 944 is a HALS molecule of comparable size to that of PIP-T, and like PIP-T is a hybrid molecule containing a hindered cyclic amine (piperidine) and a triazine ring. Chimassorb 944 is an oligomer in which the repeating unit combines a hexamethylene diamine having polysubstituted piperidyl substituents on the N atoms, the substituted diamine unit being connected to a triazine ring in which one of the other substituents is a branched chain alkylamine, and the last substituent is also a hexamethylene diamine unit.

Mainly because Chimassorb 944 contains pendant piperidyl rings rather than piperazinone rings, but perhaps also because of the relatively elongated structural configuration of the oligomeric molecule, we found that Chimassorb 944, used in combination with a 2:1 complex of an alkylated phenol phosphonate with a Group VIII or Group IIA metal, e.g. a metal bis[0-alkyl(3,5-di-t-butyl-4-hydroxybenzyl)] phosphonate ("3,5-DHBP"), is not as effective with phthalocyanine-pigmented PP as the combination of the 3,5-DHBP with a PIP-T. The unexpected and particularly noteworthy boost of color-stability derived from a 3,5-DHBP is thought to be due to the electron-withdrawing effect of the para- position of the alkylated phenol phosphonate substituent.

Though PIP-T, referred to in the aforementioned '092 Lai patent was known to be an excellent UV stabilizer in colorless organic materials when used in combination with antioxidants, there was nothing to suggest that the size and structure of the PIP-T molecule in combination with a 3,5-DHBP might be uniquely effective to stabilize phthalocyanine-pigmented PE and PP articles, alone among other polymers tested.

SUMMARY OF THE INVENTION

It has been discovered that a combination of two primary stabilizers, provides an unexpectedly effective stabilization system for articles of a polyolefin (PO) which has been pigmented with a phthalocyanine pigment. One primary stabilizer is an oxo-piperazinyl triazine ("PIP-T") in which each substitutable position on each triazine ring is substituted with a polysubstituted piperazinone; and the other is a 2:1 complex of an alkylated phenol phosphonate with a Group VIII or Group IIA metal, e.g. a metal bis[0-alkyl(3,5-di-t-butyl-4-hydroxybenzyl)] phosphonate ("3,5-DHBP" for brevity).

It is therefore a general object of this invention to provide a stabilizer system for incorporation into phthalocyanine-pigmented PO, which system affords an unexpectedly high boost in the stabilization effectiveness attributable to each primary stabilizer in the PO, and minimizes such color degradation of the PO as is typically the result of an interaction of stabilizers which lack unique compatibility relative to phthalocyanine pigments. Such unique compatibility is exhibited in articles of PO stabilized with the system; the articles having improved strength and discoloration resistance compared to that of similar articles made from identically pigmented PO but stabilized with several other commercially available hindered amines and hindered phenols, and tested by exposing the articles to infrared, visible and actinic radiation.

It has also been discovered that a stabilizer system consisting essentially of the combination of PIP-T and 3,5-DHBP, in combination with only enough secondary stabilizers such as hindered phenols, and phosphites to provide melt-stability during processing, is unexpectedly effective for stabilizing phthalocyanine-pigmented PP articles. The stabilization is not only against thermooxidative and light degradation, but also against discoloration attributable to degradation of the pigment. Such degradation is particularly noticeable in PO articles exposed to bright sunlight for about 2 years at 45° South (exposure) in the Florida sun. If the PIP-T and the 3,5-DHBP are each used in the range from about 0.1 phr to 2 phr (parts per hundred parts resin substrate), tinctorial strength of the pigment is maintained even when it is used in as small an amount as in the range from about 0.1 phr to about 1 phr in PP fibers.

It is therefore a general object of this invention to provide a phthalocyanine-pigmented PP article which has been stabilized against exposure to sunlight, by incorporating into the PP an effective amount of a combination of PIP-T and 3,5-DHBP primary stabilizers sufficient to stabilize the article so that, after exposure to bright sunlight for about 2 years at 45° South, it exhibits essentially no fading of the color due to the pigment, and essentially no polymer degradation.

It is also a general object of this invention to provide a method for imparting improved strength and discoloration resistance to stabilized, phthalocyanine-pigmented PO molded articles, extruded fibers and sheet, which method comprises incorporating into the PO only as much of a conventional melt-stabilizing secondary stabilizer, no more than 0.1 phr, as is desired for melt-stabilization of the fiber, and, an effective amount of each of two primary stabilizers, the PIP-T and the 3,5-DHBP, each in an amount sufficient to stabilize the PO and decelerate discoloration of the pigmented PO, as evidenced by minimal color fading during the useful life of an article made with the pigmented PO.

It is a specific object of this invention to provide a method for stabilizing articles made from phthalocyanine-pigmented woven and non-woven PE and PP fibers, which method comprises, exposing said phthalocyanine-pigmented fibers to an accelerated Xenon Arc Weather-O-Meter (GM test, SAE J1885) test for absorption of 1240 Kjoules, (deemed equivalent to the useful life of the fiber, or exposure to bright sunlight for about 2 years at 45° South, with less than a ±2 units of color change due to degradation of the pigment; said PE and PP fibers being essentially free of a color stabilizer and having incorporated therein (i) from 20 parts per million (ppm) to about 1 phr, preferably from 0.1 to 0.8 phr, of a phthalocyanine pigment; (ii) from 20 ppm to about 2.0 phr, preferably from 0.1 phr to 1.0 phr, of PIP-T; (iii) from 20 parts per million (ppm) to about 2.0 phr, preferably from 0.1 phr to 1.5 phr, of 3,5-DHBP, based upon the weight of the PP in the fibers or sheet.

BRIEF DESCRIPTION OF THE DRAWINGS

The foregoing and other objects and advantages of my invention will appear more fully from the following description, made in connection with the accompanying graph which illustrates the result-effectiveness of the combination of PIP-T with 3,5-DHBP and Blue 15 pigment in PP fibers essentially free of a secondary stabilizer, that is, having no more than 0.1 phr of each, a melt-stabilizing antioxidant such as a conventional hindered phenol, and a phosphite.

The figure is a chart which presents data on the change in color (delta E) due to fading of a fabric made of Blue 15-pigmented PP fibers, the data being set forth in four curves A, B, C and D plotted as a function of the amount of energy absorbed over a period of time (measured in a Weather-O-Meter). Each fiber sample made with PP and containing a primary stabilizer also contains 0.1 phr of Irganox$^R$ 3114 (a hindered phenol melt-stabilizer) and 0.08 phr Ultranox 626 (a phosphite melt-stabilizer). The curves A and B are for fabric samples made from PP fibers containing individual primary stabilizers PIP-T(5) and only Chimassorb 944 respectively. The curves C and D are for fabric samples made from PP fibers and melt-stabilized with only 0.1 phr Irganox 3114, each sample also stabilized with equal amounts of PIP-T(5) and Chimassorb 944, and each also stabilized with the same amount of Irgastab 1425 (Ca-salt of a 3,5-DHBP), respectively.

PREFERRED DESCRIPTION OF PREFERRED EMBODIMENTS

This invention is particularly directed to stabilization of phthalocyanine-pigmented PO fabrics for automobile seats, dashboards, and rear decks, and to drapes, all of which may be exposed to intense sunlight, and typically are. The temperature inside a modern car with much glass (to reduce weight) and windows up, can reach 90° C. (hence the GM test with a black panel temperature of 89° C.). Hence the commercial need for stabilized pigmented PP and PE articles (see "Growing Trends in Automotive Textiles" by G. Robert Turner *Textile Chemist and Colorist* pg 17-18 Vol 20, No. 6, 1988; "New Phillips Fiber for Automotive Market Stands Up to UV Rays", N/W Staff Report *Nonwovens World* pg 45-46, January 1989; "The Degradation of Automotive Upholstery Fabrics by Light and Heat" by Brian Milligan, pg 1-7 *Rev. Prog. Coloration* Vol 16, 1986).

In a particular embodiment, this invention provides an article made from a woven or non-woven fabric of phthalocyanine-pigmented PP fibers. Woven fabrics are produced from yarn by any one of several weaving techniques. Non-woven fabrics of PP may have a carded fiber structure or comprise a mat in which the fibers or filaments are distributed in a random array. The fibers may be bonded with a bonding agent such as a polymer, or the fibers may be thermally bonded without a bonding agent. The fabric may be formed by any one of numerous known processes including hydroentanglement or spun-lace techniques, or by air laying or melt-blowing filaments, batt drawing, stitchbonding, etc. depending upon the end use of the article to be made from the fabric.

Incorporated in the PP, and preferably uniformly distributed in the PP melt before it is spun into filaments, is (i) a small amount, about 1 phr (based on the weight of all the polymer from which the article is formed), of phthalocyanine pigment, and typically from 0.05 phr to about 0.75 phr; (ii) no more than 0.1 phr each of a secondary stabilizer, namely a hindered phenol and a phosphite, required for melt-stabilization of the PP; (iii) from about 20 ppm to about 2. phr and preferably from about 0.1 phr to about 1.0 phr, of PIP-T and (iv) from about 20 ppm to about 2. phr, and preferably from about 0.1 phr to about 1.0 phr, of a 2:1 complex of an alkylated phenol phosphonate with a Group VIII or Group IIA metal, e.g. a metal bis[0-alkyl(3,5-di-t-butyl-4-hydroxybenzyl)] phosphonate ("3,5-DHBP"), also referred to as a metal salt of a monoester of 3,5-di-t-butyl-4-hydroxybenzylphosphonic acid.

The preparation of a PIP-T is disclosed in detail in the foregoing '092 Lai patent. The PIP-T is an oxopiperazinyl triazine having a structure selected from

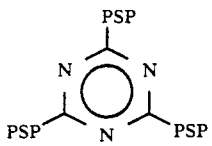

and

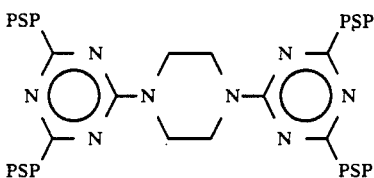

wherein PSP is a substitutent having the following formula

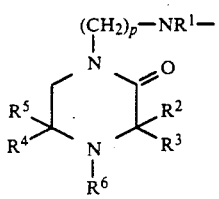

wherein $R^1$ represents $C_1$–$C_{24}$ alkyl, $C_5$–$C_7$ cycloalkyl, $C_7$–$C_{20}$ aralkyl, $C_1$–$C_{24}$ hydroxyalkyl, $C_1$–$C_{24}$ aminoalkyl, $C_1$–$C_{24}$ alkylaminoalkyl, and $C_6$–$C_{20}$ cycloaminoalkyl; $R^2$, $R^3$, $R^4$, and $R^5$, independently represent $C_1$–$C_{18}$ alkyl, or when together cyclized, $R^2$ with $R^3$, and $R^4$ with $R^5$, represent $C_4$–$C_{12}$ cycloalkyl, and $C_1$–$C_8$ alkyl-substituted cycloalkyl; and, $R^6$ is selected from the group consisting of hydrogen, $C_1$–$C_8$ alkyl, $C_1$–$C_6$ alkoxy, $C_1$–$C_6$ alkanoyl, $C_3$–$C_8$ alkenoyl and

wherein $R^7$ represents hydrogen, $C_1$–$C_{18}$ alkyl or alkenyl, phenyl or naphthyl; and, p represents an integer in the range from 2 to about 10.

Alkyl is preferably $C_1$–$C_5$ for example, methyl, ethyl, isopropyl, sec-butyl, and n-amyl, most preferably methyl.

Alkenyl is preferably $C_2$–$C_4$ for example, vinyl, allyl, and butenyl, most preferably allyl.

Cycloalkyl is preferably $C_5$–$C_7$ for example, cyclopentyl, cyclohexyl, and cycloheptyl, most preferably cyclohexyl.

Alkoxy is preferably $C_1$–$C_5$ for example, methoxy, ethoxy, isopropoxy, butoxy, and pentoxy, most preferably methoxy.

Aralkyl is preferably $C_7$–$C_{12}$ for example, benzyl, p-methylbenzyl, and 4-butylbenzyl, most preferably benzyl.

Aminoalkyl is preferably $C_1$–$C_6$ for example, methylamino, ethylamino, isopropylamino, butylamino, and pentylamino, most preferably hexylamino.

Cycloaminoalkyl is preferably $C_6$–$C_8$ for example, cyclohexyamino, cycloheptylamino, cyclooctylamino, most preferably cyclohexylamino.

Alkanoyl is preferably $C_1$–$C_5$ for example, formyl, acetyl, propionyl, butanoyl, and valeroyl, most preferably acetyl.

Alkenoyl is preferably $C_3$–$C_5$ for example, formyl, acetyl, propionyl, butanoyl, and valeroyl, most preferably acetyl.

Illustrative examples of PSPs are represented by the following structures:

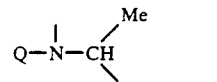  PIP-T(1)

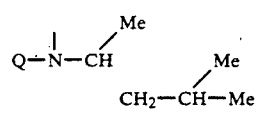  PIP-T(2)

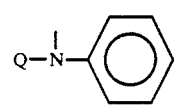  PIP-T(3)

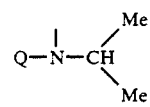  PIP-T(4)

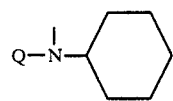  PIP-T(5)

where Q represents

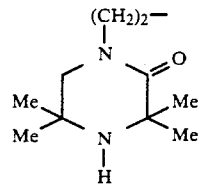

Me = methyl, and the bond on N indicates connection to the triazine ring. The preparation of a 3,5-DHBP and its use as a stabilizer is conventional and such phosphonates have been disclosed in U.S. Pat. No. 3,696,135 and the references cited therein, the disclosures of which are incorporated by reference thereto as if fully set forth herein. Typically a di-ester having the structure

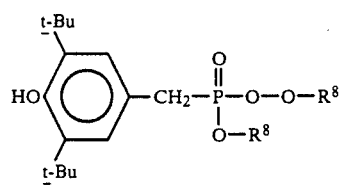

wherein $R^8$ represents $C_1$–$C_{12}$ alkyl, $C_4$–$C_{12}$ cycloalkyl, and, $C_1$–$C_8$ alkyl-substituted cycloalkyl; is saponified with an aqueous sodium or potassium hydroxide solution to give the monosodium or monopotassium salt of the corresponding monoester; neutralizing or slightly acidifying, after saponification, the reaction mixture; and thereafter adding an aqueous solution of the metal salt.

The 3,5-DHBP is represented as:

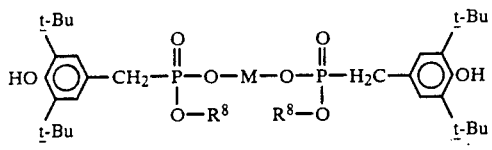

wherein M represents a Group VIII or Group IIA metal, preferably nickel or calcium.

Illustrative examples of 3,5-DHBP stabilizers are:
nickel bis[0-ethyl(3,5-di-t-butyl-4-hydroxybenzyl)] phosphonate;
cobalt bis[0-ethyl(3,5-di-t-butyl-4-hydroxybenzyl)] phosphonate; and,
calcium bis[0-ethyl(3,5-di-t-butyl-4-hydroxybenzyl)] phosphonate.

The method for imparting improved discoloration resistance to a shaped article of a polyolefin comprises incorporating into a melt from which the shaped article is formed, an effective amount, sufficient to color the article but less than 2 phr, of a phthalocyanine pigment so as to produce a phthalocyanine-pigmented article, and an effective amount, sufficient to attenuate degradation of the phthalocyanine-pigmented article when exposed to sunlight for several months, of a combination of two primary stabilizers.

The polyolefin is typically polyethylene homopolymer, or copolymers of ethylene with a minor amount of propylene, or, polypropylene homopolymer, or copolymers of propylene with a minor amount of ethylene. If desired, to facilitate melt-processing of the PO, particularly if the PO is to be subjected to multiple thermoforming operations at a temperature above 200° C., a melt-stabilizing quantity of a secondary stabilizer, may also be used, the amount being no more than is necessary to provide melt-stabilization, namely 0.1 phr. The preferred phthalocyanine-pigmented, 3,5-DHBP-stabilized, PO has so small an amount of antioxidant (AO) added to it that the AO does not make a sufficiently noticeable adverse contribution towards negative interaction upon exposure to sunlight, and is tolerable. Such a small amount of AO may be present in commercially available AO-free PP fibers, added thereto for process stability to facilitate its manufacture. Additives other than an AO, may be added if it is known they do not adversely affect the desired color, or help degrade the physical properties of the PP fibers when exposed to sunlight. Such additives may include lubricants in addition to alkaline earth metal stearates, near-colorless or white fillers such as glass fibers or talc, and optical brighteners.

Preferred hindered phenol secondary stabilizers are
1,3,5-tris-(3',5'-di-t-butyl-4-hydroxybenzyl)isocyanurate;
1,3,5-tris-(3,5-di-t-butyl-4-hydroxybenzyl)-2,4,6trimethylbenzene;
ethyleneglycol-bis(3,3-bis-3'-t.butyl-4'-hydroxyphenyl)-butyrate;
pentaerythrit-tetra-[3-(3,5-di-t-butyl-4-hydroxyphenyl)-propionate];
octadecyl-tetra-[3-(3,5-di-t-butyl-4-hydroxyphenyl)propionate];
bisethyleneglycol-bis(3,3-bis-3-t.butyl-4'-hydroxyphenyl)propionate];
hexamethylene-1,6-di-[3-(3,5-di-t-butyl-4-hydroxyphenyl)propionate]; and the like.

Preferred phosphite secondary stabilizers are (a) the symmetrical pentaerythritol phosphites represented by the structure

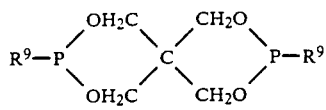

wherein $R^9$ is derived from a $C_{12}$-$C_{24}$ monohydric alcohol preferably $C_{18}$ such as in Weston 618, or a di-$C_1$-$C_{12}$ alkyl-substituted phenol, preferably 2,4-di-t-butylphenol such as in Ultranox; and, (b) symmetrical triaryl phosphites represented by the structure

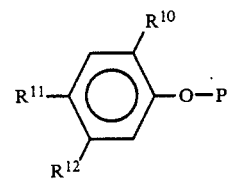

wherein $R^{10}$ represents t-butyl, 1,1-dimethylpropyl, cyclohexyl or phenyl, and one of $R^{11}$ and $R^{12}$ is hydrogen and the other is hydrogen, methyl, t-butyl, 1,1-dimethylpropyl, cyclohexyl or phenyl.

If desired secondary stabilizers other than a phosphite or hindered phenol may be used, and may be desirable with other pigment colors, but each secondary stabilizer is always used in an amount less than 0.1 phr, sufficient to provide adequate melt-stabilization but insufficient to accelerate discoloration with the phthalocyanine pigment used. Additional amounts of secondary stabilizers may be used, but with additional risk of causing side reactions, and with no economic justification for doing so. No conventional color stabilizer, other than such color stabilizing effect which might be attributable to such trace amounts of secondary stabilizers, if these are used, is either desirable or necessary.

Typically PP is polypropylene homopolymer, but may be a random or block copolymer of propylene and a monoolefinically unsaturated monomer X, (P-co-X) with up to about 30% by wt of X wherein X represents a minor amount by wt of a monoolefinically unsaturated monomer, such as ethylene, vinyl acetate, or a lower $C_1$-$C_4$ alkyl acrylate or methacrylate. Blends of such propylene polymers with other polymers such as polyethylene are also included within the scope of this invention. In an analogous manner, PE is typically polyethylene homopolymer, but may be E-co-X, where in addition, X may be propylene. For convenience, homopolymer PE or PP and copolymers E-co-X or P-co-X are together referred to herein as polyolefin PO, no distinction being made with respect to it as a substrate, compared to homopolymers and copolymers of ethylene and propylene. When phthalocyanine-pigmented PO is to be stabilized, it preferably has a number average mol wt Mn in the range from about 10,000 to about 500,000, preferably about 30,000 to about 300,000 with a melt flow index from 0.1 to 100 g/10 min when measured according to ASTM D-1238.

Solely for the purpose of facilitating processing of the PO melt, particularly for melt extrusion of the PO, a metal stearate such as calcium or zinc stearate in an amount insufficient to deleteriously affect the color of the fibers, preferably in the range from about 100 ppm to about 1500 ppm.

Since a predominant concern is the desired color contributed by the phthalocyanine pigment, only enough of the pigment is added to the normally water white PO to produce the color, but no more than 2 phr. The optimum amount of phthalocyanine pigment for individual articles will depend upon the type of article, whether fibers, sheet or injection molded, for example, and the conditions under which the article is expected to be used. Further, the optimum amount will depend upon the particular phthalocyanine pigment to be used, and the change in color which will be acceptable over a specified period of time.

The phthalocyanine pigment, PIP-T and 3,5-DHBP stabilizer may readily be incorporated into the PO by any conventional technique at a convenient stage prior to thermoforming the PO. For example, in the melt-extrusion of PP to form fibers, the pigment and stabilizer may be mixed with the PP in dry powder form, or a suspension or emulsion of the stabilizer may be mixed with a solution, suspension, or emulsion of the polymer.

Articles made of phthalocyanine-pigmented, stabilized PO, and particularly household goods and clothing made from PO fibers, once placed in service, are likely to be used for several years but are not likely to be exposed continuously to several years of bright sunshine at 45° South (exposure). When noticeable fading of the pigment does eventually occur, the article has provided so large a proportion of its useful life that its color degradation is not objectionable.

In the comparative tests made and recorded in the following experiments color change is measured according to the Standard Method for Calculation of Color Differences from Instrumentally Measured Color Coordinates, ASTM D 244-85. The change in color measured in this manner does not reflect the peach-skin appearance due to broken fibers of degraded yarn. The useful life of the fabric is terminated when its surface becomes fuzzy as a peaches'. Visual inspection under an optical microscope shows that individual fibers in the matrix of the yarn are broken.

Polymer degradation is measured qualitatively by placing a sample of fabric under a low power optical microscope and scraping the surface of the yarn with a blunt spatula. When fibers are readily broken while the yarn is being scraped, the fabric has been degraded even if the color change is acceptably low.

The GM Weather-O-Meter tests are conducted as described in Summary of Test Conditions for SAE J1885 using a Xenon Arc Weather-O-Meter with controlled irradiance and water cooled lamp, as follows:

|  | Light | Dark |
|---|---|---|
| Irradiance watts/m² @340 nm | 0.55 | — |
| Black Panel Temp., °C. | 89 | 38 |
| Relative Humidity, % | 50 | 95 |
| Cycle Time, hr | 3.8 | 1.0 |

EXAMPLES

In the following examples, the effectiveness of the most closely related prior art combination of Chimassorb 944 ("Chim 944" in the Table below) with Irgastab 1425 ("I-1425") is compared with the combination of PIP-T(5) and I-1425, using fibers which were spun from a 12 melt flow polypropylene (Himont 6301) at about 509° F. (265° C.) with 0.6 phr of each stabilizer, and about 1 phr of Blue 15 which is sufficient to provide the fibers with an intense blue color when the pigment is homogeneously dispersed in the melt. Because the fibers are extruded twice at 275° C., 0.1 phr of Irganox 3114, a hindered phenol stabilizer, and 0.08 phr of Ultranox 626, a phosphite melt stabilizer, are used as secondary stabilizers.

Woven fabrics of the pigmented PP fibers containing specified amounts of each primary stabilizer, were exposed to the conditions of heat and light for which conditions the comparative tests are to be made.

It was observed that, before exposure, all samples of fabric were uniformly bright blue. Immediately after irradiation, there is a distinct change in color, and the change in color is in the same portion of the spectrum for each sample.

The test results in a Xenon Weather-O-Meter and from measurements of change in color, made as described hereinbefore, are set forth in the Table.

TABLE

| Stabilizer | conc. phr | Kjoules to failure | Color change (ΔE) at failure |
|---|---|---|---|
| none | 0.0 | ≃150 | 0.5 |
| PIP-T(5) |  | 300 | 7.4 |
|  |  | 500 | 7.5 |
|  |  | 800 | 9.0 |
|  |  | 1050 | 11.2 |
| Chim 944 | 0.6 | 350 | 8 |
|  |  | 550 | 9.4 |
|  |  | 750 | 7.8 |
| I-1425 | 0.6 | 350 | 4.4 |
| Chim 944 + | 0.6 + 0.6 | 600 | 1.9 |
| I-1425 |  | 750 | 1.4 |
|  |  | 1000 | 2.5 |
|  |  | 1200 | 0.4 |
|  |  | 1500 | 1.8 |
| PIP-T(5) + | 0.6 + 0.6 | 600 | 2.7 |
| I-1425 |  | 750 | 1.9 |
|  |  | 1000 | 1.4 |
|  |  | 1200 | 2.1 |
|  |  | 1500 | 1.1 |
|  |  | 1700 | 2.0 |
|  |  | 1950 | 2.2 |

It is evident from the foregoing data that either combination of primary stabilizers will protect fiber integrity well beyond that of the individual additives, and beyond 1240 Kjoules.

In the case of PIP-T(5) by itself, the samples show a large color change initially, which remains about the same until near fiber failure when the color change increases to 11.2. This is illustrated in the drawing, in which curve A shows that a sample of Blue 15-pigmented PP fibers (0.6 phr pigment) stabilized with 0.6 phr of PIP-T(5) as the only primary stabilizer. The fibers fail after 1050 Kjoules of exposure, indicating a net change of about 4.

In the case of Chimassorb 944 by itself, such color change as does occur, occurs within the early period absorption up to about 350 Kjoules, and thereafter does not change. This is illustrated in Curve B which plots color change for a similarly pigmented sample stabilized with 0.6 phr Chimassorb 944 as the only primary stabilizer; the sample shows a color change of about 8 after 400 Kjoules of exposure. The fibers fail after 800 Kjoules of exposure, and there is no further color change.

The pigmented and unstabilized (except melt-stabilized) fibers maintain their bright blue color with essentially no change, but fail so early that there is insufficient time for the color to be affected.

The melt-stabilized fibers pigmented with Irgastab 425, and no primary stabilizer show substantial change in color after absorption of only 350 Kjoules.

With the addition of 0.6 phr Irgastab 1425 to a similarly pigmented sample containing 0.6 phr Chimassorb 944, curve C shows essentially no net color change over the life of the fiber, though the actual color change is about 2.

With the addition of 0.6 phr Irgastab 1425 to a similarly pigmented sample containing 0.6 phr PIP-T(5), curve D also shows essentially no net color change over the life of the fiber, though the actual color change is slightly more than about 2.

In all instances, the testing is carried out in accordance with the GM Weather-O-Meter testing procedure set forth in SAE J1885 which is incorporated by reference thereto as if fully set forth herein. The last point on each curve represents the point at which the fibers in the sample failed due to the amount of energy absorbed.

It is evident that the net color change (net ΔE) for the sample D is less than about ±1 for an exposure of 1950 Kjoules, at which point failure occurs. This is well within the range ±2 for 1240 Kjoules exposure set forth as a commercially desirable criterion of color stability. Though the net color change for sample C is slightly less than that seen in sample D, the fiber fails after 1500 Kjoules.

In an analogous manner, less exhaustive tests currently being conducted with phthalocyanine-pigmented polypropylene sheet, polyethylene fibers and sheet, injection molded articles of copolymers of propylene and ethylene, and glass fiber reinforced extruded I-beam sections and other thermoformed structural members made from polypropylene and polyethylene, appear to indicate that the color stabilization in them, due to the combination of the PIP-T and the 3,5-DHBP primary stabilizers, is unexpectedly much better than that obtained with a combination of Chimassorb 944 and the 3,5-DHBP.

Having thus provided a general discussion, described the exceptional color stability imparted to a polyolefin which is stabilized with the combination of the primary stabilizers, and set forth specific illustrations of the invention in support thereof, it is to be understood that no undue restrictions be imposed by reason thereof, except as provided by the following claims.

I claim:

1. A method for imparting improved discoloration resistance to a shaped article of a polyolefin, comprising, incorporating into a melt from which said shaped article is formed, an effective amount, sufficient to color the article from 0.1 phr but less than 2 phr, of a phthalocyanine pigment so as to produce a phthalocyanine-pigmented article, and an effective amount, sufficient to attenuate degradation of said phthalocyanine-pigmented article when exposed to sunlight, of a combination of two primary stabilizers substantially free of secondary stabilizers, including (a) a substituted oxo-piperazinyl triazine ("PIP-T") having a structure selected from the group consisting of

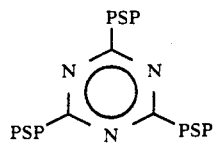

and

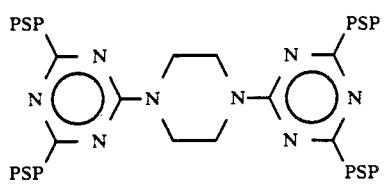

wherein PSP is a substituent having the following formula

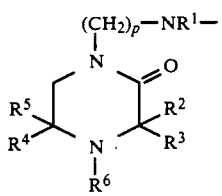

wherein $R^1$ represents $C_1-C_{24}$ alkyl, $C_5-C_7$ cycloalkyl, $C_7-C_{20}$ aralkyl, $C_1-C_{24}$ hydroxyalkyl, $C_1-C_{24}$ aminoalkyl, $C_1-C_{24}$ alkylaminoalkyl, and $C_6-C_{20}$ cycloaminoalkyl; $R^2$, $R^3$, $R^4$, and $R^5$, independently represent $C_1-C_{18}$ alkyl, or when together cyclized, $R^2$ with $R^3$, and $R^4$ with $R^5$, represent $C_4-C_{12}$ cycloalkyl, and $C_1-C_8$ alkyl-substituted cycloalkyl; and, $R^6$ is selected from the group consisting of hydrogen, $C_1-C_8$ alkyl, $C_1-C_6$ alkoxy, $C_1-C_6$ alkanoyl, $C_3-C_8$ alkenoyl and

wherein $R^7$ represents hydrogen, $C_1-C_{18}$ alkyl or alkenyl, phenyl or naphthyl; and, p1 represents an integer in the range from 2 to about 10; and, (b) a 2:1 complex of an alkylated phenol phosphonate with a metal ("3,5-DHBP") represented by the structure:

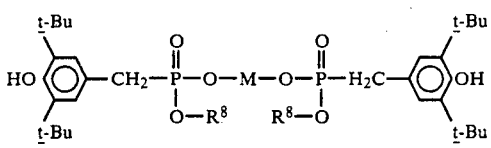

wherein $R^8$ represents $C_1-C_{12}$ alkyl, $C_4-C_{12}$ cycloalkyl, and, $C_1-C_8$ alkyl-substituted cycloalkyl; and, M represents a Group VIII or Group IIA metal.

2. The method of claim 1 wherein said polyolefin is selected from the group consisting of a homopolymer of ethylene, a copolymer of ethylene with a minor amount by weight of propylene, a copolymer of ethylene with a minor amount by weight of propylene, a random or block copolymer (E-co-X) wherein E represents ethylene and X represents a minor amount by weight of a monoolefinically unsaturated monomer, a homopolymer of propylene, a copolymer of propylene with a minor amount by weight of ethylene, a copolymer of propylene with a minor amount by weight of ethylene, and a random or block copolymer (P-co-X) wherein P represents propylene.

3. The method of claim 2 comprising exposing said phthalocyanine-pigmented in a Xenon Arc Weather-O-Meter SAE J1885 test for a period sufficient to absorb 1240 Kjoules, and resulting in less color change than ±2; and, said PIP-T is specified by, R hu 1 being $C_3$-$C_{12}$ alkyl, and $C_6$-$C_7$ cycloalkyl;

$R^2$ and $R^3$ are each $C_1$-$C_3$ alkyl, and together, when cyclized represent cyclohexyl, methylcyclohexyl, or cycloheptyl;

$R^4$ and $R^5$ are each $C_1$-$C_3$ alkyl, and together, when cyclized represent cyclohexyl, methylcyclohexyl, or cycloheptyl; and, $R^6$ is hydrogen, $CH_3$, $C_1$-$C_3$ alkoxy or $C_2$-$C_3$ acyl.

4. The method of claim 3 wherein said PSP is represented by a structure selected from the group consisting of

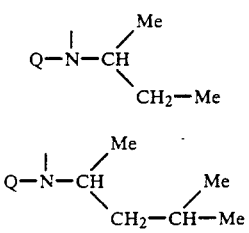

PIP-T(1)

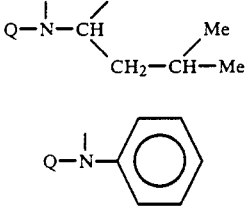

PIP-T(2)

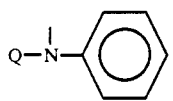

PIP-T(3)

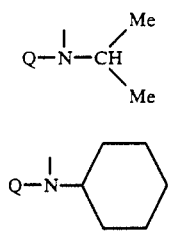

PIP-T(4)

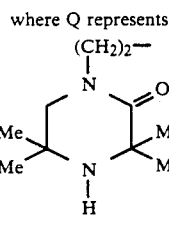

PIP-T(5)

where Q represents

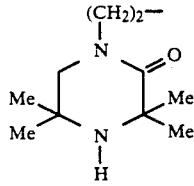

Me = methyl, and the bond on N indicates connection to the triazine ring.

5. The method of claim 4 wherein said metal is selected from the group consisting of nickel and calcium.

6. The method of claim 4 wherein said phthalocyanine pigment is selected from the group consisting of Blue 15, Blue 16, Blue 29, Blues 15:1 through 15:6, Green 7, Green 36-Y, Green 36-6Y and combinations thereof.

7. The method of claim 6 wherein said phthalocyanine pigment is present in an amount in the range from 0.1 phr to about 1 phr; said PIP-T is present in an amount in the range from 20 ppm to about 2 phr; said 3,5-DHBP is present in an amount in the range from 20 ppm to about 2 phr; based on the weight of said polyolefin.

8. The method of claim 3 wherein said article is formed by melt-extruding said polyolefin, and said melt includes a secondary stabilizer present in no more than a meltstabilizing amount, less than 0.1 phr.

9. The method of claim 7 wherein said article is formed by melt-extruding said polyolefin, and said melt includes a secondary stabilizer present in no more than a meltstabilizing amount, less than 0.1 phr.

10. The method of claim 9 wherein said polyolefin is selected from polypropylene homopolymer and a copolymer of propylene with a minor amount of ethylene; and, said secondary stabilizer is selected from a hindered phenol and a phosphite.

11. An article of manufacture of improved discoloration resistance, formed from a polyolefin containing an effective amount, sufficient to color the article from 0.1 phr but less than 2 phr, of a phthalocyanine pigment so as to produce a phthalocyanine-pigmented article, and an effective amount, sufficient to attenuate degradation of said phthalocyanine-pigmented article when exposed to sunlight, of a combination of two primary stabilizers, the first a (a) a substituted oxo-piperazinyl triazine ("PIP-T") having a structure selected from the group consisting of

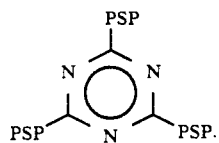

and

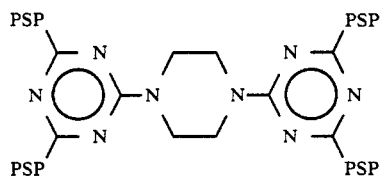

wherein PSP is a substitutent having the following formula

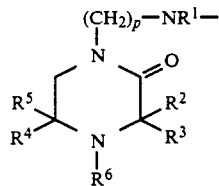

wherein $R^1$ represents $C_1$-$C_{24}$ alkyl, $C_5$-$C_7$ cycloalkyl, $C_7$-$C_{20}$ aralkyl, $C_1$-$C_{24}$ hydroxyalkyl, $C_1$-$C_{24}$ aminoalkyl, $C_1$-$C_{24}$ alkylaminoalkyl, and $C_6$-$C_{20}$ cycloaminoalkyl;

$R^2$, $R^3$, $R^4$, and $R^5$, independently represent $C_1$-$C_{18}$ alkyl, or when together cyclized, $R^2$ with $R^3$, and $R^4$ with $R^5$, represent $C_4$-$C_{12}$ cycloalkyl, and $C_1$-$C_8$ alkyl-substituted cycloalkyl; and, $R^6$ is selected from the group consisting of hydrogen, $C_1$-$C_8$ alkyl, $C_1$-$C_6$ alkoxy, $C_1$-$C_6$ alkanoyl, $C_3$-$C_8$ alkenoyl and

wherein $R^7$ represents hydrogen, $C_1$-$C_{18}$ alkyl or alkenyl, phenyl or naphthyl; and, p1 represents an integer in the range from 2 to about 10; and (b) a 2:1 complex of an alkylated phenol phosphonate with a metal ("3,5-DHBP") represented by the structure:

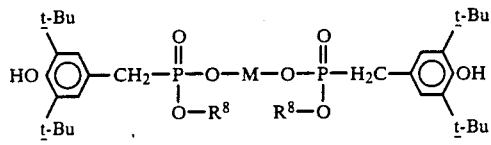

t-Bu = t-butyl wherein $R^8$ represents $C_1$-$C_{12}$ alkyl, $C_4$-$C_{12}$ cycloalkyl, and, $C_1$-$C_8$ alkyl-substituted cycloalkyl; and, M represents a Group VIII or Group IIA metal.

12. The article of claim 11 wherein said polyolefin is selected from the group consisting of a homopolymer of ethylene, a copolymer of ethylene with a minor amount by weight of propylene, a copolymer of ethylene with a minor amount by weight of propylene, a random or block copolymer (E-co-X) wherein E represents ethylene and X represents a minor amount by weight of a monoolefinically unsaturated monomer, a homopolymer of propylene, a copolymer of propylene with a minor amount by weight of ethylene, a copolymer of propylene with a minor amount by weight of ethylene, and a random or block copolymer (P-co-X) wherein P represents propylene.

13. The article of claim 12 wherein exposing said phthalocyanine-pigmented in a Xenon Arc Weather-O-Meter SAE J1885 test for a period sufficient to absorb 1240 Kjoules, and resulting in less color change than ±2; and, said PIP-T is specified by, $R^1$ being $C_3$-$C_{12}$ alkyl, and $C_6$-$C_7$ cycloalkyl;

$R^2$ and $R^3$ are each $C_1$-$C_3$ alkyl, and together, when cyclized represent cyclohexyl, methylcyclohexyl, or cycloheptyl;

$R^4$ and $R^5$ are each $C_1$-$C_3$ alkyl, and together, when cyclized represent cyclohexyl, methylcyclohexyl, or cycloheptyl; and, $R^6$ is hydrogen, $CH_3$, $C_1$-$C_3$ alkoxy or $C_2$-$C_3$ acyl.

14. The article of claim 13 wherein said PSP is represented by a structure selected from the group consisting of

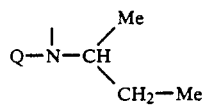
PIP-T(1)

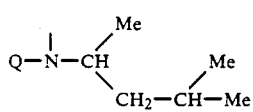
PIP-T(2)

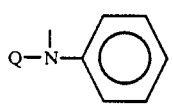
PIP-T(3)

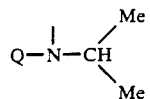
PIP-T(4)

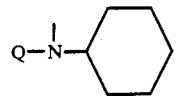
PIP-T(5)

where Q represents

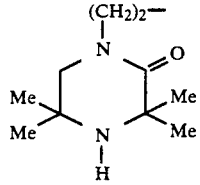

Me = methyl, and the bond on N indicates connection to the triazine ring.

15. The article of claim 14 wherein said metal is selected from the group consisting of nickel and calcium.

16. The article of claim 14 wherein said phthalocyanine pigment is selected from the group consisting of Blue 15, Blue 16, Blue 29, Blues 15:1 through 15:6, Green 7, Green 36-Y, Green 36-6Y and combinations thereof.

17. The article of claim 6 wherein said phthalocyanine pigment is present in an amount in the range from 20 ppm to about 1 phr; said PIP-T is present in an amount in the range from 0.1 phr to about 2 phr; said 3,5-DHBP is present in an amount in the range from 20 ppm to about 2 phr; based on the weight of said polyolefin.

18. The article of claim 13 wherein said article is formed by melt-extruding said polyolefin, and said melt includes a secondary stabilizer present in no more than a melt-stabilizing amount, less than 0.1 phr.

19. The article of claim 17 wherein said article is formed by melt-extruding said polyolefin, and said melt includes a secondary stabilizer present in no more than a melt-stabilizing amount, less than 0.1 phr.

20. The article of claim 19 wherein said polyolefin is selected from polypropylene homopolymer and a copolymer of propylene with a minor amount of ethylene; and, said secondary stabilizer is selected from a hindered phenol and a phosphite.

21. A multi-component stabilizer system for stabilizing pigmented polyolefin against discoloration, thermooxidative degradation, and degradation due to ultraviolet light, consisting essentially of (a) no more than a melt-stabilizing quantity of a secondary stabilizer, and an effective amount, sufficient to color the article from 0.1 phr but less than 2 phr, of a phthalocyanine pigment so as to produce a phthalocyanine-pigmented article, and an effective amount, sufficient to attenuate degradation of said phthalocyanine-pigmented article when exposed to sunlight, of a combination of two primary stabilizers identified as "PIP-T" and "3,5-DHBP" herebelow; said PIP-T being a substituted oxo-piperazinyl triazine having a structure selected from the group consisting of

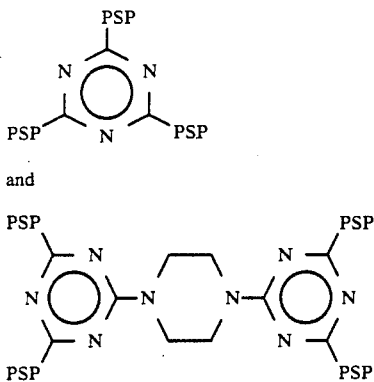

and

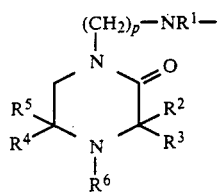

wherein PSP is a substitutent having the following formula

wherein $R^1$ represents $C_1$-$C_{24}$ alkyl, $C_5$-$C_7$ cycloalkyl, $C_7$-$C_{20}$ aralkyl, $C_1$-$C_{24}$ hydroxyalkyl, $C_1$-$C_{24}$ aminoalkyl, $C_1$-$C_{24}$ alkylaminoalkyl, and $C_6$-$C_{20}$ cycloaminoalkyl; $R^2$, $R^3$, $R^4$, and $R^5$, independently represent $C_1$-$C_{18}$ alkyl, or when together cyclized, $R^2$ with $R^3$, and $R^4$ with $R^5$, represent $C_4$-$C_{12}$ cycloalkyl, and $C_1$-$C_8$ alkyl-substituted cycloalkyl; and, $R^6$ is selected from the group consisting of hydrogen, $C_1$-$C_8$ alkyl, $C_1$-$C_6$ alkoxy, $C_1$-$C_6$ alkanoyl, $C_3$-$C_8$ alkenoyl and $$R^7-\overset{O}{\underset{\|}{C}}-$$

wherein $R^7$ represents hydrogen, $C_1$-$C_{18}$ alkyl or alkenyl, phenyl or naphthyl; and, p represents an integer in the range from 2 to about 10;

(b) said 3,5-DHBP being a 2:1 complex of an alkylated phenol phosphonate with a metal represented by the structure:

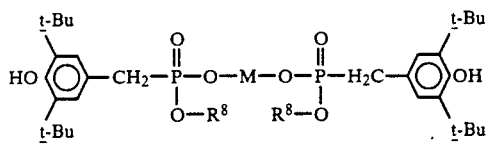

wherein $R^8$ represents $C_1$-$C_{12}$ alkyl, $C_4$-$C_{12}$ cycloalkyl, and, $C_1$-$C_8$ alkyl-substituted cycloalkyl; and, M represents a Group VIII or Group IIA metal.

22. The of stabilizer system claim 21 wherein said polyolefin is selected from the group consisting of a homopolymer of ethylene, a copolymer of ethylene with a minor amount by weight of propylene, a copolymer of ethylene with a minor amount by weight of propylene, a random or block copolymer (E-co-X) wherein E represents ethylene and X represents a minor amount by weight of a monoolefinically unsaturated monomer, a homopolymer of propylene, a copolymer of propylene with a minor amount by weight of ethylene, a copolymer of propylene with a minor amount by weight of ethylene, and a random or block copolymer (P-co-X) wherein P represents propylene.

23. The stabilizer system of claim 22 comprising exposing said phthalocyanine-pigmented in a Xenon Arc Weather-O-Meter SAE J1885 test for a period sufficient to absorb 1240 Kjoules, and resulting in less color change than ±2; and, said PIP-T is specified by, $R^1$ being $C_3$-$C_{12}$ alkyl, and $C_6$-$C_7$ cycloalkyl;

$R^2$ and $R^3$ are each $C_1$-$C_3$ alkyl, and together, when cyclized represent cyclohexyl, methylcyclohexyl, or cycloheptyl;

$R^4$ and $R^5$ are each $C_1$-$C_3$ alkyl, and together, when cyclized represent cyclohexyl, methylcyclohexyl, or cycloheptyl; and, $R^6$ is hydrogen, $CH_3$, $C_1$-$C_3$ alkoxy or $C_2$-$C_3$ acyl.

24. The stabilizer system of claim 23 wherein said PSP is represented by a structure selected from the group consisting of

 PIP-T(1)

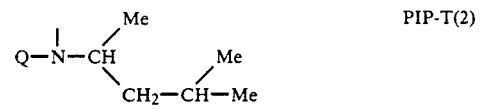 PIP-T(2)

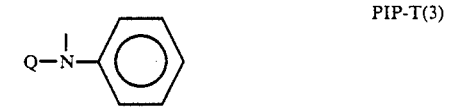 PIP-T(3)

 PIP-T(4)

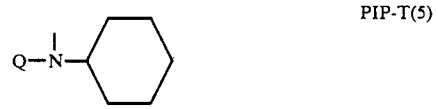 PIP-T(5)

where Q represents

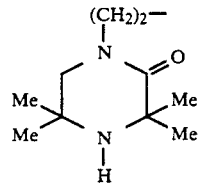

Me = methyl, and the bond on N indicates connection to the triazine ring.

25. The stabilizer system of claim 24 wherein said metal is selected from the group consisting of nickel and calcium.

26. The stabilizer system of claim 24 wherein said phthalocyanine pigment is selected from the group consisting of Blue 15, Blue 16, Blue 29, Blues 15:1 through 15:6, Green 7, Green 36-Y, Green 36-6Y and combinations thereof.

27. The stabilizer system of claim 26 wherein said phthalocyanine pigment is present in an amount in the range from 0.1 phr to about 1 phr; said PIP-T is present in an amount in the range from 20 ppm to about 2 phr; said 3,5-DHBP is present in an amount in the range from 20 ppm to about 2 phr; based on the weight of said polyolefin.

28. The stabilizer system of claim 23 wherein said article is formed by melt-extruding said polyolefin, and said melt includes a secondary stabilizer present in no more than a melt-stabilizing amount, less than 0.1 phr.

29. The stabilizer system of claim 27 wherein said article is formed by melt-extruding said polyolefin, and said melt includes a secondary stabilizer present in no more than a melt-stabilizing amount, less than 0.1 phr.

30. The stabilizer system of claim 29 wherein said polyolefin is selected from polypropylene homopolymer and a copolymer of propylene with a minor amount of ethylene, and, said secondary stabilizer is selected from a hindered phenol and a phosphite.

* * * * *